United States Patent Office 3,445,539
Patented May 20, 1969

3,445,539
SELECTIVE HYDROGENATION OF CONJUGATED DIENIC COMPOUNDS
George R. Lester, Park Ridge, Ill., assignor to Universal Oil Products Company, Des Plaines, Ill., a corporation of Delaware
No Drawing. Filed Oct. 13, 1967, Ser. No. 675,014
Int. Cl. C07c 11/00, 5/06
U.S. Cl. 260—677
8 Claims

ABSTRACT OF THE DISCLOSURE

Dienic compounds are selectively hydrogenated from a mixture of monoolefinic and polyolefinic hydrocarbons by treating the mixture with a ruthenium chloride catalyst and hydrogen whereby any conjugated diolefinic hydrocarbons present are selectively hydrogenated to monoolefinic hydrocarbons.

---

This invention relates to a process for the selective hydrogenation of conjugated diolefinic compounds, and particularly to a process for the selective hydrogenation of conjugated diolefinic hydrocarbons. More particularly, the invention is concerned with a process for the selective hydrogenation of conjugated diolefinic hydrocarbons utilizing a particular catalytic composition of matter which is hereinafter set forth in greater detail.

The presence of conjugated diolefinic hydrocarbons in the product which is obtained by the dehydrogenation of paraffinic hydrocarbons constitute undesirable and unwanted portions of the product. The conjugated diolefinic hydrocarbons will have a contaminating effect in many instances. For example, when utilizing a dehydrogenation product comprising a straight-chain olefin of relatively long length in a process involving the preparation of detergent, the presence of conjugated diolefins is undesirable inasmuch as said diolefins may be disulfated in the sulfation step. This will tend to waste the sulfating reagent and the disulfating compounds will tend to give undesirable characteristics to the final product. Furthermore, conjugated diolefinic hydrocarbons may have a deleterious effect when the dehydrogenated product is utilized in subsequent processes such as alkalation or hydrolysis, inasmuch as the diolefins can act as catalyst poisoners. For example, conjugated diolefins may form a catalyst-containing sludge when the alkylation catalyst comprises a Friedel-Crafts catalyst such as aluminum chloride, aluminum bromide, etc. Other deleterious effects which will result from the presence of conjugated diolefinic hydrocarbons in an alkylating agent product will be that the reaction is slowed down considerably, the diolefins will have a negative effect on the quality of the end product and, in addition, a higher catalyst concentration will be required in order to effect any reaction.

In this respect it has now been unexpectedly discovered that certain catalyst compositions of matter of the type hereinafter set forth in greater detail may be utilized to selectively hydrogenate conjugated diolefinic compounds, and particularly conjugated diolefinic hydrocarons, without substantially affecting monoolefinic hydrocarbons or non-conjugated polyolefinic hydrocarbons. A particularly useful catalytic composition of matter which is utilized in the selective hydrogenation of conjugated diolefinic hydrocarbons comprises certain ruthenium containing compounds in which the ruthenium component of the catalyst is present in a certain valence.

It is therefore an object of this invention to provide a process for the selective hydrogenation of diolefinic compounds.

A further object of this invention is to provide a process for the selective hydrogenation of conjugated diolefinic hydrocarbons utilizing certain catalytic compositions of matter as the hydrogenation catalyst.

In one aspect an embodiment of this invention is found in a process for the selective hydrogenation of a conjugated diolefinic hydrocarbon which comprises treating a mixture of monoolefinic hydrocarbons, nonconjugated polyolefinic hydrocarbons and conjugated diolefinic hydrocarbons with hydrogen in the presence of a catalyst comprising ruthenium chloride at hydrogenation conditions, and recovering a mixture of monoolefinic and nonconjugated polyolefinic hydrocarbons.

A specific embodiment of this invention is found in a process for the selective hydrogenation of a conjugated diolefinic hydrocarbon which comprises treating a mixture of pentenes and 2-methyl-1,3-butadiene with hydrogen in the presence of a catalyst comprising ruthenium chloride in which the ruthenium compound of said catalyst is in a valence state of 2 at a temperature from ambient to 300° C. and a hydrogen pressure of 1 to 100 atmospheres, and recovering the resultant mixture of isomeric pentenes.

Other objects and embodiments will be found in the following further detailed description of the present invention.

As hereinbefore set forth the present invention is concerned with a process for the selective hydrogenation of conjugated diolefinic compounds and particularly conjugated diolefinic hydrocarbons. The selective hydrogenation is usually effected by treating a mixture of monoolefinic hydrocarbons, nonconjugated polyolefinic hydrocarbons and conjugated diolefinic hydrocarbons with hydrogen in the presence of certain catalytic compositions of matter. In the preferred embodiment of the invention the catalyst comprises a ruthenium chloride in which the ruthenium component of the catalyst has a valence of +2. The desired catalyst may be prepared by different processes. For example, one method of preparing the desired catalyst is to reduce an aqueous solution of $(NH_4)_2RuCl_6$ with titanium trichloride using an excess of the titanium trichloride in a reactor which has been purged with nitrogen, the characteristic deep blue color of ruthenium in a valence state of 2 appearing when the reagents are mixed. Another method of preparing the desired catalyst is to reduce ruthenium trichloride hydrate in aqueous solution to the desired complex using hydrogen and a platinum metal catalyst. However, when utilizing this method it is necessary to employ an excess of hydrochloride acid in order to avoid complete reduction to elemental ruthenium. Inasmuch as the ruthenium chloride complex in which the ruthenium is present in a valence state of 2 is easily oxidized to a compound in which the ruthenium is present in a valence state of 3 it is necessary to effect the process of this invention in an oxygen-free atmosphere. Therefore dissolved air must be removed from the hydrocarbon feed stock using nitrogen as a purge, and in addition, in some instances it may also be necessary to remove organic peroxides using a ferrous sulfate wash.

Examples of organic hydrocarbons which may be treated according to the process of this invention will include compounds containing from 4 to 26 carbon atoms in length such as 1,3-butadiene, 1,3-pentadiene, 1,3-hexadiene, 1,3-heptadiene, 1,3-octadiene, 1,3-nonadiene, 1,3-decadiene, 1,3-undecadiene, 1,3-dodecadiene, 1,3-tridecadiene, 1,3-hexadecadiene, 1,3-octadecadiene, 1,3-nonadecadiene, 1,3-eicosadiene, 1,3-hexaeicosadiene, the 2,4- and branched chain isomers of the aforementioned compounds etc. These compounds may be present in mixtures of isomeric butenes, pentenes, hexenes, heptenes, octenes, nonenes, decenes, eicosenes, etc. and nonconjugated polyolefinic hydrocarbons such as 1,4-pentadiene, 1,4-hexadiene, 1,4-heptadiene, 1,5-octadiene, 1,8-nonadiene, 1,5-decadiene, 1,4-tetradecadiene, 1,6-hexadecadiene, etc. It is to be understood that the aforementioned mono-olefinic nonconjugated polyolefinic and conjugated diolefinic hydrocarbons are only representative of the class of compounds which may be treated, and that the present invention is not necessarily limited thereto.

The process of this invention may be effected in any suitable manner and comprise either a batch or continuous type operation. For example, when a batch type operation is used a quantity of the olefinic mixture which is to undergo selective hydrogenation of the conjugated dienic hydrocarbons present in the mixture is placed in a reaction apparatus. In addition, the ruthenium chloride catalyst in which the ruthenium component is present in a valence state of +2 is also added to the reaction vessel. As hereinbefore set forth, care must be taken in order that the hydrocarbon feed stock is free of any dissolved air, organic peroxides, or any other compounds containing oxygen. Therefore, the feed stock, before being placed in the reaction apparatus is dried and subjected to a nitrogen purge in order to remove any contaminating influences which may be present. In addition the catalyst is also treated in a similar manner by undergoing a nitrogen purge. The vessel is sealed and heated to the desired operating temperature which may range from ambient (about 25° C.) up to the boiling point of the solution which may be 300° C. or more. Following this, hydrogen is pressed in until the desired operating pressure which may range from 1 atmosphere up to about 100 atmospheres of hydrogen pressure is reached. The selective hydrogenation is allowed to proceed for a predetermined period of time which may range from 1 up to 10 hours or more in duration. At the end of this time the reactor, if superatmospheric temperatures have been used, is allowed to cool to room temperature and the excess pressure is vented. The reaction mixture is recovered and separated from the catalyst. Following this the reaction mixture may then be subjected to fractional distillation whereby the mono-olefinic hydrocarbons are separated from nonconjugated polyolefines. In addition, if so desired, the reaction may be effected in the presence of substantially inert solvents in order to facilitate the mixing of the reactant. Examples of these inert organic solvents are methyl alcohol, ethyl alcohol, propyl alcohol, n-pentane, n-hexane, n-heptane, benzene, toluene, o-xylene, m-xylene, p-xylene, etc.

It is also contemplated within the scope of this invention that the process may be effected in a continual manner of operation. For example, when this type of operation is used, the feed stock comprising a mixture of mono-olefinic hydrocarbons, conjugated diolefinic hydrocarbons and nonconjugated polyolefinic hydrocarbons is continually charged to a reaction zone which is maintained at the proper operating conditions of temperature and pressure. The feed stock is treated in a manner similar to that hereinbefore set forth before entry into said reactor, that is, by being dried and purged with nitrogen in order to remove any contaminates which may have a deleterious effect on the catalyst. The catalyst, comprising a ruthenium chloride complex in which the ruthenium is in a valence state of +2 is also added to the reaction zone after undergoing a nitrogen purge. The aforementioned desired pressure is attained by the introducing of hydrogen to the reaction vessel in an amount sufficient to maintain the operating pressure. However, it is also contemplated within the scope of this invention, that the hydrogen introduced for the selective hydrogenation reaction may account for only a portion of the operating pressure, the remainder of said pressure being provided for by the use of an inert gas such as nitrogen to augment the hydrogen pressure. After completion of the desired residence time the reactor effluent which comprises the mono-olefinic hydrocarbons and nonconjugated polyolefinic hydrocarbons is continuously withdrawn from the reaction zone and subjected to a separation process by any manner known in the art such as fractional distillation etc. to recover the desired product.

The following examples are given to illustrate the process of the present invention which, however, are not intended to limit the generally broad scope of the present invention in strict accordance therewith.

Example I

A ruthenium chloride catalyst in which the ruthenium component was present in a valence state of +2 was prepared by treating aqueous ammonium ruthenium chloride with titanium trichloride using an excess of titanium trichloride in a reactor which had been purged with nitrogen. The aforementioned characteristic deep blue color of ruthenium in a +2 valence state appeared when the reactants were mixed.

A hydrocarbon charge stock comprising a blend of about 24% isoprene, 35% octene-1, and 41% n-nonane was charged to the reactor. This feed stock was treated prior to introduction into the reaction vessel by a nitrogen purge whereby dissolved air was removed from the hydrocarbon. The vessel, which comprised a hydrogenation bomb was sealed and hydrogen pressed in until an initial pressure of 5 atmospheres was reached. The bomb was maintained at ambient temperature and under 5 atmospheres of hydrogen pressure for a period of 2 hours. At the end of this time the bomb was cooled to a temperature of about −76° C., the excess pressure was vented and the bomb was opened. The reaction product was recovered and subjected to analysis by means of a gas-liquid chromatograph which disclosed the selective hydrogenation of isoprene to the various isopentenes, said isomers including 3-methyl butene-1, 2-methyl butene-1, with a major portion going to 2-methyl butene-2. No isopentane was found, the octene-1 was isomerized to a mixture of normal octenes but no octane was found.

Example II

A second ruthenium chloride catalyst was prepared by reducing a solution ruthenium trichloride hydrate $$[Ru(Cl)_3 \cdot (H_2O)_3]$$

in water with hydrogen using a platinum metal catalyst in a Parr apparatus at 50° C., said reduction being effected in the presence in a 3 molar excess of hydrogen chloride.

To a reaction vessel comprising a hydrogenation bomb was added the catalyst prepared according to the above paragraph which had been pretreated with a nitrogen purge. The feed stock comprising a mixture of about 20% isoprene, 31% octene-1, and 34% n-nonane was charged to the reactor after having been purged by nitrogen. The bomb was sealed and maintained at a temperature of about 25° C. for a period of about 2 hours keeping the reactor under a hydrogen pressure of 5 atmospheres. At the end of this time the vessel was cooled to −76° C., and depressurized and the product recovered. Gas-liquid chromatographic analysis of the product disclosed the fact that the isoprene was converted to a mixture of 3-methylbutene-1, 2-methylbutene-1 and a major portion of 2-methylbutene-2, the octene-1 being isomerized but not hydrogenated by the selective hydrogenation process.

Example III

A ruthenium chloride catalyst which is prepared in a manner similar to that set forth in Example I above is purged with nitrogen and charged to a hydrogenation bomb. A feed stock comprising a mixture of octene-1, 1,3-hexadiene, 1,4-heptadiene, and n-decane is also purged with nitrogen and charged to the bomb. The bomb is sealed and heated to a temperature of about 75° C. while hydrogen is pressed in until an initial pressure of 100 atmospheres is reached. The bomb is maintained at this temperature and pressure for a period of 3 hours. At the end of which time the bomb is cooled to a temperature of —76° C. to minimize vaporization and hydrogen stripping losses when depressurizing the bomb. Upon separating the reaction product from the catalyst and subjecting said product to gas-liquid chromatographic analysis it will be found that the 1,3-hexadiene has been selectively hydrogenated to isomeric hexenes, the octene-1 has been isomerized but not hydrogenated, and the 1,4-heptadiene has been isomerized to a mixture of heptadienes and the 1,3-heptadiene so formed has been largely converted to heptenes.

Example IV

In this example a ruthenium chloride catalyst prepared according to the catalyst set forth in Example II above is charged to a hydrogenation bomb after pretreatment by means of a nitrogen bomb. A mixture of isomeric nonconjugated decadienes, 1,3-decadine, and isomeric decenes is also charged to this hydrogenation bomb after pretreatment in a similar manner. The bomb is sealed, heated to a temperature of about 75° C. while hydrogen is pressed in until an initial pressure of 50 atmospheres is reached. The bomb and contents thereof are maintained at this temperature and pressure for a period of 3 hours. At the end of this time the bomb is cooled to a temperature of about —76° C. in order to minimize vaporization and hydrogen diffusion loss when the bomb is depressurized. The reaction product is recovered separated from the catalyst and subjected to a gas-liquid chromatographic analysis. This analysis will disclose the fact that the 1,3-decadiene has been converted to isomeric decenes. The original decenes and nonconjugated decadienes being largely uneffected by the selective hydrogenation process except for some isomerization.

Example V

A ruthenium chloride catalyst in which the ruthenium component is present in a valence state of +2 is prepared in accordance with the manner set forth in Example I above. A charge stock comprising a mixture of 1,3-tetradecadiene, isomeric tetradecenes and non-conjugated tetradecadienes along with n-decane as a solvent is placed in a hydrogenation bomb along with the catalyst and subjected to a selective hydrogenation process similar to that set forth in the above examples. Upon completion of the desired residence time which is effected at a temperature of about 75° C. and a hydrogen pressure of about 50 atmospheres, the reaction product is recovered separated from the catalyst and subjected to analysis. This analysis will disclose the fact that the 1,3-tetradecadiene has been converted to isomeric tetradecenes, the original tetradecenes and non-conjugated tetradecadienes being largely uneffected by the selective hydrogenation process except via isomerization.

Example VI

In this example a ruthenium chloride catalyst prepared in accordance with the manner set forth in Example II above is placed in a hydrogenation bomb along with a mixture of isomeric eicosenes, nonconjugated eicosadienes and 1,3-eicosadiene, utilizing n-decane as a solvent. As in the above examples the feed stock and catalyst are treated with a nitrogen purge to remove any oxygen-containing contaminates which may be present. The bomb is sealed heated to a temperature of about 100° C. and hydrogen pressed in until an initial pressure of 100 atmospheres is reached. Upon completion of the desired residence time the bomb is cooled to approximately —75° C. and the reaction product, after depressurization of the bomb is recovered and separated from the catalyst. Analysis of this product will disclose the fact that the 1,3-eicosadiene has been converted to isomeric eicosenes, the original eicosenes and nonconjugated eicosadienes being largely uneffected by the hydrogenation process except via isomerization.

I claim as my invention:
1. A process for the selective hydrogenation of a conjugated diolefinic hydrocarbon which comprises treating a mixture of monoolefinic hydrocarbons, nonconjugated polyolefinic hydrocarbons and conjugated diolefinic hydrocarbons with hydrogen in the presence of a catalyst comprising ruthenium chloride at hydrogenation conditions, and recovering a mixture of monoolefinic and nonconjugated polyolefinic hydrocarbons.
2. The process as set forth in claim 1 further characterized in that the ruthenium component of said catalyst is in a valence state of +2.
3. The process as set forth in claim 1 further characterized in that said hydrogenation conditions include a temperature in the range of from ambient to about 300° C. and a hydrogen pressure in the range of from 1 to about 100 atmospheres.
4. The process as set forth in claim 1 further characterized in that said conjugated diolefin comprises 2-methyl-1,3-butadiene.
5. The process as set forth in claim 1 further characterized in that said conjugated diolefin comprises 1,3-octadiene.
6. The process as set forth in claim 1 further characterized in that said conjugated diolefin comprises 1,3-decadiene.
7. The process as set forth in claim 1 further characterized in that said conjugated diolefin comprises 1,3-tetradecadiene.
8. The process as set forth in claim 1 further characterized in that said conjugated diolefin comprises 1,3-eicosadiene.

References Cited

UNITED STATES PATENTS 2,944,094   7/1960   Rylander et al. _____ 260—677
3,268,608   8/1966   Ross et al. _____ 260—668

DELBERT E. GANTZ, Primary Examiner.

J. D. MYERS, Assistant Examiner.

U.S. Cl. X.R.

260—683.9